March 10, 1964     C. A. FORSLUND     3,124,191
SKIDDING GUARD FOR PNEUMATIC VEHICLE TIRES
Filed March 23, 1962
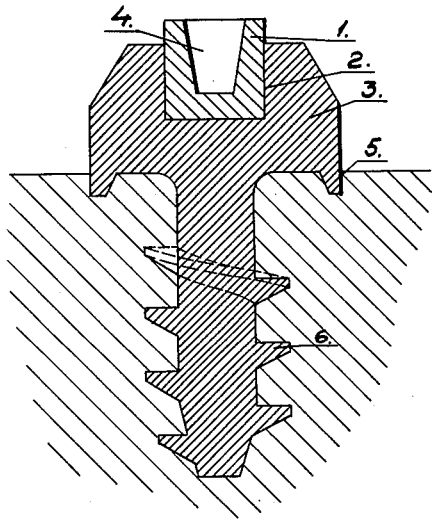
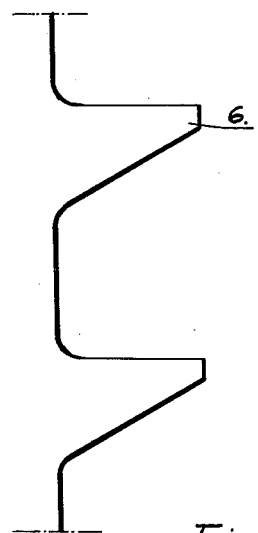
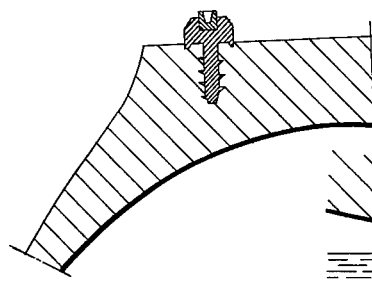
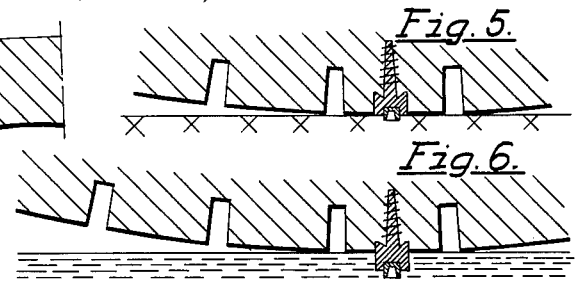
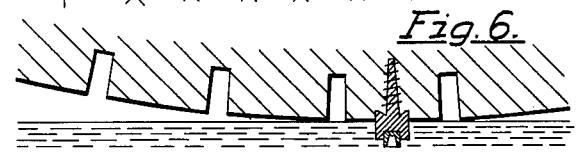
INVENTOR.
Carl Axel Forslund
BY
Richards & Geier
ATTORNEYS

United States Patent Office

3,124,191
Patented Mar. 10, 1964

3,124,191
SKIDDING GUARD FOR PNEUMATIC
VEHICLE TIRES
Carl Axel Forslund, Medlemsvagen 71,
Johanneshov, Sweden
Filed Mar. 23, 1962, Ser. No. 181,902
5 Claims. (Cl. 152—210)

Various skidding guards for pneumatic vehicle tires are previously known. As a rule these have been provided with exchangeable studs that would be fixed in their positions by means of an end plate adapted to be pressed against the inside of the tire in some way or other. These skidding guards have as a rule proved to be reliable in ice rink racing and other competitive driving, whereas they would not be entirely serviceable in normal highway or service driving with ordinary passenger cars or trucks. The skidding guard according to the present invention, however, is made for the purpose of answering this requirement and consists of a screw adapted to be threaded directly into the outer material layer of the tire, the lower side of the head of the screw being in an unloaded tire located approximately on a level with the tread surface of the tire.

The invention is principally distinguished by the feature that the head of the screw has secured therein an inset of hard metal extending over the head, said inset member being preferably provided with a conically shaped recess.

A further distinguishing feature of the invention consists in that the head of the screw is preferably provided on the lower side thereof with an annular flange along the peripheral portion of the tire, said flange being adapted to grip into and to secure the holding of the screw in the material layer.

In practical experiments undertaken certain valuable experiences for the construction and the dimensioning of the screw have been attained, and these will be indicated herein below in connection with an illustration of a form of embodiment of the skidding guard in the accompanying drawing.

FIG. 1 shows a vertical section through a skidding guard on a larger scale.

FIG. 2 illustrates approximately in the natural size the location of a skidding guard threaded into a tire.

FIG. 3 shows the profile of the thread according to FIG. 2 on a larger scale.

FIGS. 4–6 are a diagrammatic representation of the functioning of the skidding guard.

FIG. 7 shows a suitable location of the skidding guard along one side of the tread surface of the tire in connection with different road coatings.

In the drawing, 1 designates a cylindrically shaped hard metal inset, which has been braced by hard soldering 2 into a bore in the head 3 of the screw. The inset 1 is provided with a preferably conical shaped recess 4. FIG. 4 shows a skidding guard 4 according to the invention as arranged on a tire just when the skidding guard comes into contact with the track of the road, and said recess makes it that the gripping capacity in connection with an unsuitable bottom layer such as ice or snow is multiplied, and practical tests have shown that the conical shape of the recess 4 gives the effect that the recess becomes self-cleaning, that is to say, that the particles, which at the engagement of the skidding guard with the track are collected in the recess, are thrown out of said recess in the rotation of the tire, so that the recess at the next engagement with the track will be practically free from said particles, which provides a constant perfect gripping capacity.

The recess is advantageously given a diameter amounting to ⅔ of the diameter of the inset, wherein the axial extension of the recess corresponds approximately to ⅔ of the axial extension of the inset.

The head 3 of the screw is provided at the bottom along the outer edge with an annular flange 5. The threads 6 have in the embodiment shown a right-angled triangular profile, the same being severed at the top, so that the profile of the thread becomes trapezoidal. The threads may be pointed right out, however, or may be rounded at the top.

The pitch of the thread in the screw should according to the invention be ¼–¾ of the outer diameter of the thread, and the profile of the thread should be equilateral or right-angled triangular with a top angle of 30–70°. The top of the thread may preferably be rounded to a suitable radius or may be severed in parallel to the longitudinal axis, so that the profile of the thread becomes trapezoidal.

The gripping flange 5 should according to the invention have a height $h$, which is $\frac{1}{20}$–$\frac{1}{5}$ of the diameter of the head of the screw, and the width or base of the same should be $\frac{1}{20}$–$\frac{1}{5}$ of the diameter of the head of the screw and have a square or triangular section.

To facilitate retraction of the screw into the tire, an aperture is preferably first bored with a diameter somewhat smaller than the core diameter of the screw. A skidding guard made in accordance with the invention has an extraordinary hold, is mounted easily and rapidly and gives by reason of the shape of the inset 4 a very good grip in the track.

FIG. 5 shows how the skidding guard functions in cooperation with a hard and for the engagement of the guard unsuitable track such as a bare concrete or asphalt track. From the same figure it appears that the skidding guard, which is based on the elasticity of pneumatic rubber tires, enters with the head of the screw into the tread of the tire and is concealed therein, only the hard metal inset coming in contact with the surface of the ground. Through the given dimensioning of the screw the latter will never by itself come into contact with a rubber tube provided on the inside of the tire, in which latter case puncturing of the tire could be feared. Again, if the track is of such a nature that the skidding guard may provide an effective engagement in the track, the skidding guard takes its gripping position indicated in FIG. 6.

As will appear from FIGS. 2 and 7, the skidding guard is only arranged along one or both outer edges of the treads of the tires. Thereby, the advantage is obtained that only when the vehicle is swaying in a curve and the risk of lateral skidding is serious, is the skidding guard caused to grip into the track.

I claim:

1. A skidding guard for a pneumatic vehicle tire, comprising a screw having a head and a body portion with the threads of trapezoidal profile, said screw being adapted to be threaded into the tire up to the lower surface of the head thereof, said head having an integral annular flange extending from and perpendicularly to said lower surface, whereby said flange projects into the tire when said screw is threaded into the tire up to said lower surface, said head having a cylindrical bore upon the outer surface thereof, and an inset firmly fixed within said bore and extending beyond said outer surface of the head, said inset having a conical outwardly extending recess coaxial with said screw, said head having side surfaces comprising conical portions extending in a direction opposite to that of the conical recess.

2. A skidding guard for a pneumatic tire in accordance with claim 1 wherein the threads of said screw have a pitch of between ¼ and ¾ of the outer diameter of said threads, and the profile of said thread is triangular with a top angle of between 30° and 70°.

3. A skidding guard for a pneumatic vehicle tire in accordance with claim 1 wherein the height of the annular flange on the head of said screw is between $\frac{1}{5}$ and $\frac{1}{20}$ of the diameter of said head.

4. A skidding guard for a pneumatic vehicle tire in accordance with claim 1 wherein the maximum diameter of the recess in said insert is equal to $\frac{2}{3}$ the diameter of said insert.

5. A skidding guard for a pneumatic vehicle tire in accordance with claim 1 wherein the axial dimension of the recess in said insert is equal to $\frac{2}{3}$ the length of said insert.

References Cited in the file of this patent

UNITED STATES PATENTS

| | | |
|---|---|---|
| 857,745 | Mesinger | June 25, 1907 |
| 1,684,102 | Leustig et al. | Sept. 11, 1928 |
| 2,931,411 | Keehan | Apr. 5, 1960 |
| 2,982,166 | Hobbs | May 2, 1961 |

FOREIGN PATENTS

| | | |
|---|---|---|
| 786,297 | Great Britain | Nov. 13, 1957 |